United States Patent
Kaneko

[11] Patent Number: 5,684,769
[45] Date of Patent: Nov. 4, 1997

[54] OPTICAL RECORDING/PLAYBACK APPARATUS INCORPORATING AN ADDRESS REPRODUCING AMPLIFIER HAVING A SWITCHABLE GAIN FOR REPRODUCING ADDRESS DATA AND MO RECORDED DATA

[75] Inventor: Shinji Kaneko, Kanagawa, Japan

[73] Assignee: Sony Corporation, Tokyo, Japan

[21] Appl. No.: 546,402

[22] Filed: Oct. 20, 1995

[30] Foreign Application Priority Data

Oct. 21, 1994  [JP]  Japan .................................. 6-256941

[51] Int. Cl.$^6$ .................................................. G11B 7/125
[52] U.S. Cl. ........................ 369/47; 369/124; 369/32; 369/58; 369/116
[58] Field of Search ........................ 369/124, 13, 110, 369/32, 54, 58, 47, 48, 106, 116

[56] References Cited

U.S. PATENT DOCUMENTS

| | | | |
|---|---|---|---|
| 4,833,662 | 5/1989 | Yoda | 369/124 |
| 4,890,274 | 12/1989 | Kaneko | 369/124 |
| 5,475,671 | 12/1995 | Ishikawa | 369/124 |

*Primary Examiner*—Aristotelis M. Psitos
*Assistant Examiner*—Alan Faber
*Attorney, Agent, or Firm*—Limbach & Limbach L.L.P.

[57] ABSTRACT

A optical recording/playback apparatus projects a laser beam on to a recording medium to read out precoded address data and record or read out data in the data recording area of the recording medium. The reflected light from the recording medium is detected by photosensors which produce currents from the received light intensity, and the currents are converted into voltage signals by current-to-voltage converting amplifiers and the signals are summed by a summing amplifier. The summing amplifier has a switching means, by which the gain is brought to unity or near-unity value during the period of reading the data recording area, so that the summed output has a smaller difference of voltage levels for the address area and data recording area even though the detected light intensity has a large difference between these portions. The output of summing amplifier is fed through a high-pass filter prior to the zero-cross detection, and a smaller differentiation pulse resulting from the smaller voltage level difference enables the reliable readout of address data.

6 Claims, 8 Drawing Sheets

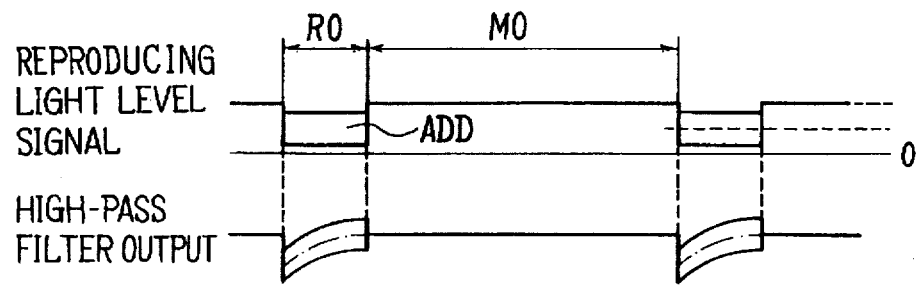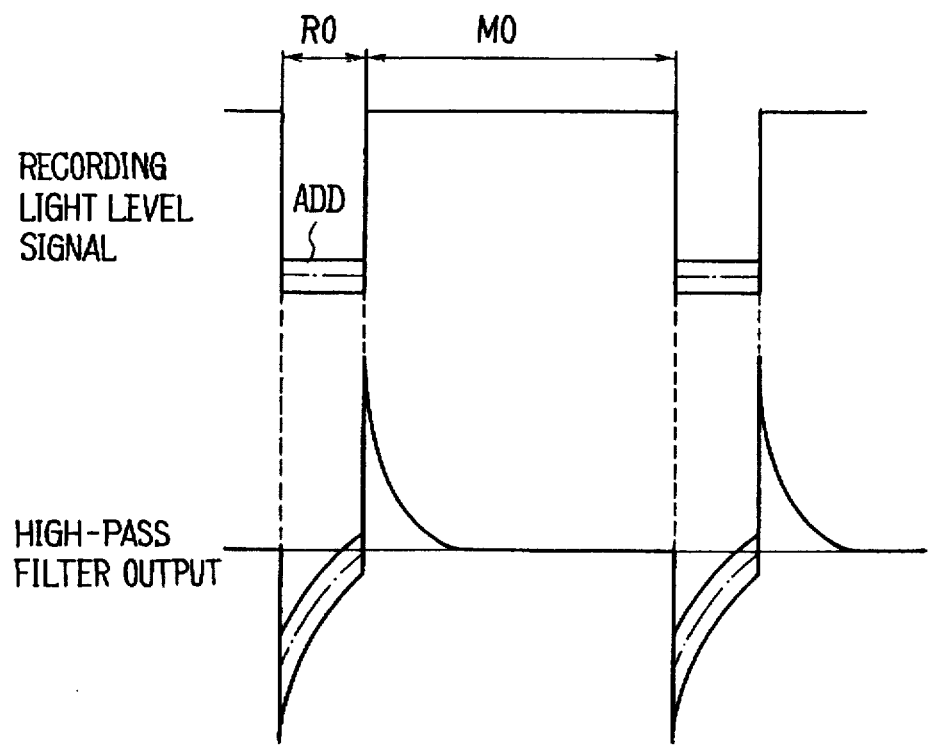

OPTICAL RECORDING/PLAYBACK APPARATUS INCORPORATING AN ADDRESS REPRODUCING AMPLIFIER HAVING A SWITCHABLE GAIN FOR REPRODUCING ADDRESS DATA AND MO RECORDED DATA

BACKGROUND OF THE INVENTION

1. Field of the Invention

The present invention relates to a optical recording/playback apparatus having an optical system for recording and reading out data on a optical recording medium such as a rewritable magneto-optical disk (MO disk), and particularly to an optical recording/playback apparatus capable of accurately reproducing address data which is preformatted on the recording medium.

2. Description of the Prior Art

A magneto-optical disk has its recording area partitioned into an inner recording area (channel 1) and an outer recording area (channel 2), with each recording track of each area being divided into multiple sectors, e.g. 42 sectors, as shown in FIG. 5A. Each sector consists of a precoded (prerecorded) address area ADD and a data recording area MO as shown in FIG. 5B.

The address area ADD includes three sets of address data ADD1, ADD2 and ADD3 of the same content located consecutively following a sector marker SM as shown in FIG. 5B. Each address data includes VFO data, address marker AM and identification data ID. The VFO (variable frequency oscillator) data is a frequency signal used for the pull-in of the PLL oscillator for clock generation. Each item of address data is preformatted bit data. The three sets of address data are followed by a post-amble data PA.

The address area ADD is followed by the data recording area MO. The data recording area MO is headed by a test area, which contains a record of ALPC data for controlling the power level of the laser diode and VFO data. The data recording area MO ends with a buffer area (blank area) which borders the address area ADD of the successive sector. The number of sectors and the number of bytes of sector are shown for example in FIG. 5B.

A laser beam is projected on to the MO disk 18 for recording data on the disk or reading out address data and recorded data from the disk. The power of the laser beam (laser power) and the magnitude of a current produced by a photodiode (photodiode current) which is used as a photosensor for detecting the reflected light of the laser beam have a linear relationship as shown in FIG 6.

The laser power required for reading out address data and recorded data from the MO disk 18 is relatively small and is about 1.2 mW, while the laser power required for recording or erasing data is as large as about 8 to 9 mW.

The photodiode current is proportional to the laser power as shown in FIG. 8. When the address area ADD is exposed to the laser beam, it produces different reflected light intensities depending on the presence or absence of a pit, and accordingly the photodiode produces different current levels depending on the operational mode. A signal derived from the reflected light intensity will be termed "light level signal", and it represents the total quantity of light received by the photodiode.

FIG. 8A shows an example of the light level signal in the reading mode. The light level signal has properties pertinent to the address area ADD and data recording area MO as follows. In the address area ADD, a high-frequency signal is produced by pits of address data, whereas in the data recording area MO, where data is reproduced based on the degree of polarization of Kerr effect, no inherent recorded data is reproduced from the total quantity of reflected light.

The light level signal is shown in FIG. 8A, and it provides address data (including VFO data) read out of the address area ADD. The signal from the address area ADD has an amplitude centered by a d.c. level that is about half the d.c. level of the data recording area MO or the buffer area where no pits are formed.

The address data reproducing circuit in which photodiodes are included has a comparator (zero-cross detection circuit), and address data is reproduced based on the zero-cross point of the light level signal which is fed to the comparator through a high-pass filter so as to eliminate s d.c. component.

Due to the use of the high-pass filter, the light level signal at the input of the comparator has a differentiation waveform as shown by FIG. 8B. The differentiation waveform has its peak level determined from the difference between the average d.c. level of the crude light level signal of the address area ADD and the d.c. level of the other signal portion. Since the laser power is as small as about 1.2 mW in the reading mode, the differentiation output (high-frequency output) of the high-pass filter has a small peak level as shown by FIG. 8B.

This signal level variation is small enough for the zero-cross detection signal of the comparator to follow the high-frequency output, and it is possible to retrieve address data correctly from the high-frequency output having the distorted waveform.

However, in the erasing mode or recording mode in which laser power is large, the high-frequency output may not always be extracted correctly. In the erasing mode, for example, data in the data recording area MO is erased by using laser power of about 8.4 mW as shown in FIG. 7, and at this time the reproducing laser power in the address area ADD is very small compared to the erasing laser power in the MO area small and the light level signal in terms of the photodiode current appears as shown by FIG. 9A.

The output current differentiated by the high-pass filter has a large peak level due to the large output current difference as shown by FIG. 9B. The address data signal which is fed to the comparator by being superimposed on this differentiation pulse will have a significantly large variation of zero-cross point for the leading section of the address area (area of the first address data ADD1), and it is almost impossible to read out data of this area correctly without error. The same situation arises in the recording mode.

SUMMARY OF THE INVENTION

The present invention is intended to solve the foregoing prior art problem, and its prime object is to provide a optical recording/playback apparatus capable of reproducing address data correctly by preventing the occurrence of such a differentiation waveform as shown by FIG. 9B.

In order to achieve the above objective, the invention resides in a optical recording/playback apparatus which projects a laser beam on to a optical recording medium, on which address data is precoded, to read out address data and record or read out data in the data recording area, wherein the reflected light of the laser beam is detected by photosensors, the output currents are converted into light level signals and then summed by current-to-voltage converting amplifiers and a summing amplifier having its gain controlled separately for the address area and data recording area, and the signal is processed for high-pass filtering and zero-cross detection to reproduce data.

BRIEF DESCRIPTION OF THE DRAWINGS

FIGS. 8A and 8B are waveform diagrams showing the light level signals in the reading mode based on the conventional circuit arrangement;

FIGS. 9A and 9B are waveform diagrams showing the light level signals in the erasing mode based on the conventional circuit arrangement.

DETAILED DESCRIPTION OF THE PREFERRED EMBODIMENTS

An embodiment of the present invention will be explained in detail with reference to the drawings.

Figure 4:
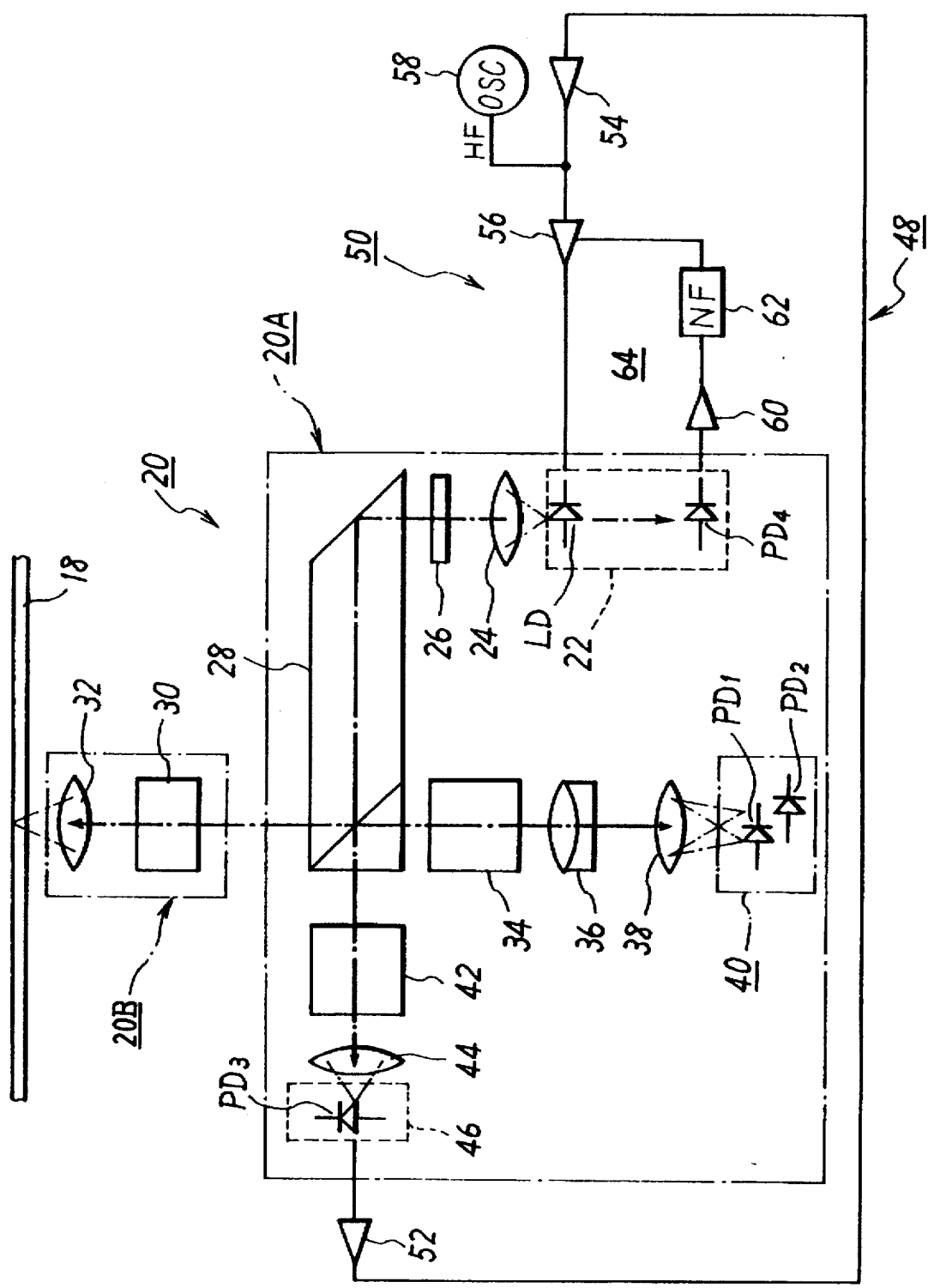
FIG. 4 is a block diagram of the optical recording/ playback apparatus based on this invention.
Figure 5A:
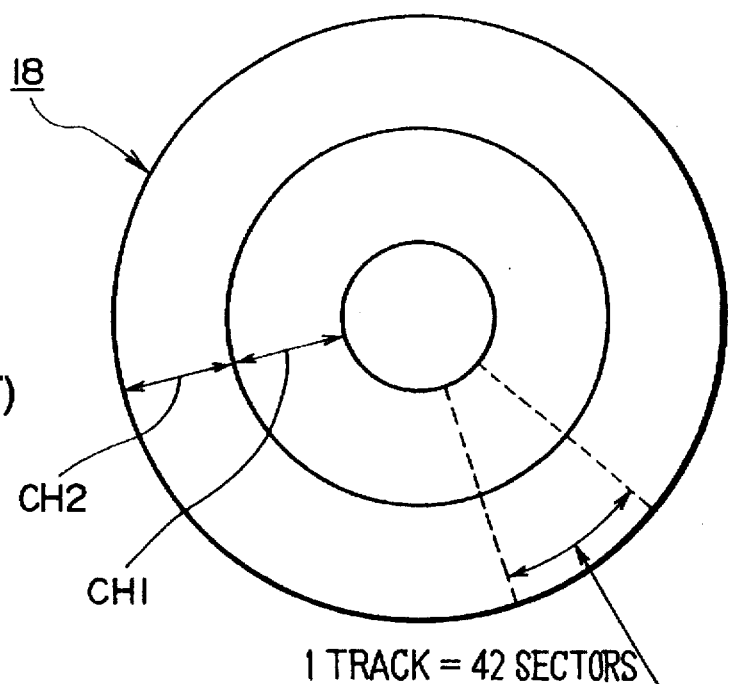
FIGS. 5A and 5B are diagrams showing an example of the recording format of the magneto-optical disk.
Figure 5B:
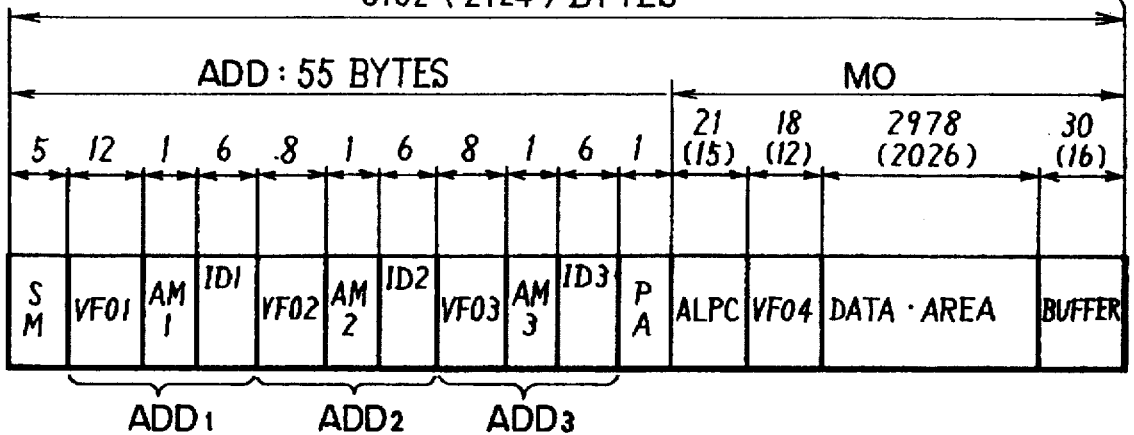
Figure 6:
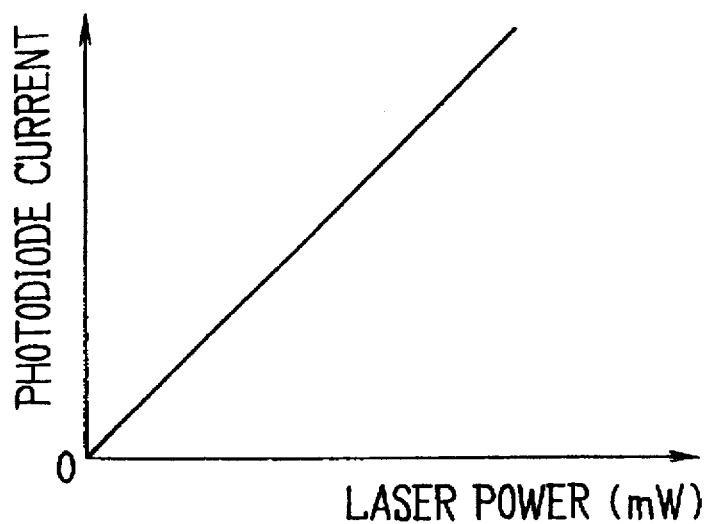
FIG. 6 is a graph showing the relationship between the laser power and photodiode current.
Figure 7:
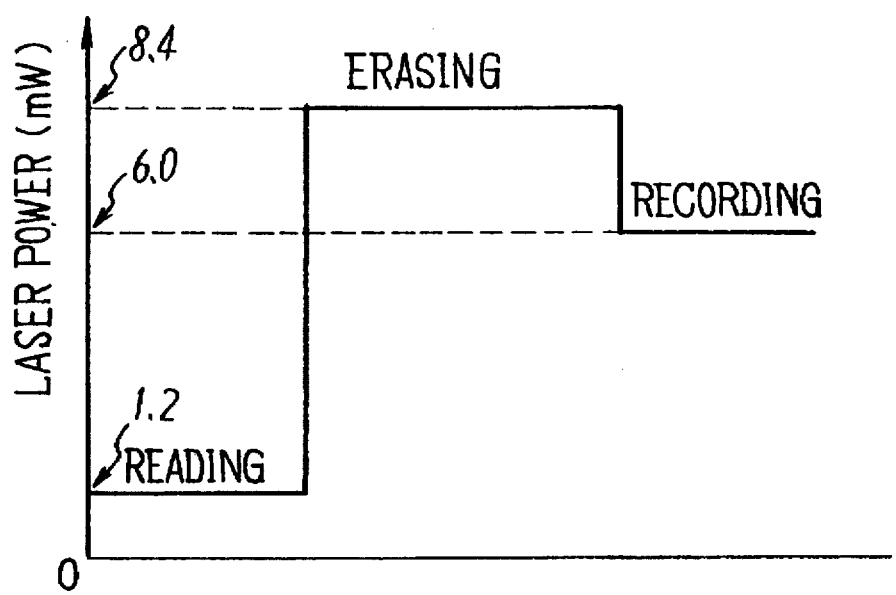
FIG. 7 is a diagram showing the laser power in each operational mode.

FIG. 4 shows an example of the optical recording/ playback apparatus based on this invention. The apparatus 10 includes an optical system 20 disposed under a magneto-optical disk (MO disk) 18. In this example, the optical system 20 consists of a fixed optical system 20A including a laser source and a movable optical system 20B which directs the laser beam from the laser source to the lower side of the disk 18 and implements the focusing and tracking servo control for the laser beam.

The movable optical system 20B includes an objective lens 32, a lens actuator (not shown) for moving the objective lens 32 for focusing and tracking, and a polarizing prism 30 for altering the light path.

The fixed optical system 20A includes a laser source 22 which is a laser diode LD. The laser diode LD emits a laser beam, which is formed into a parallel light beam by a collimator lens 24, diffracted by a grating 26 which is a diffraction prism, and is incident to a beam splitter (BS) 28. The laser beam which has passed through the beam splitter 28 is directed by the polarizing prism 30 in the movable optical system 20B and projected by the objective lens 52 on to the surface of the MO disk 18.

The projected laser beam on the MO disk 18 has its reflected light optically polarized based on the Kerr effect depending on the state of a recorded signal on the disk surface. The polarized and reflected laser beam goes through the beam splitter 28 and is incident to a Wollaston prism 34, which is a kind of double refraction prism, by which the reflected light is separated into a P-component wave and a S-component wave. The reflected light is converged by a lens 36, and is incident to a multilens 38, by which the P-component wave and S-component wave are directed to photosensors 40 which are photodiodes PD1 and PD2.

The photodiodes PD1 and PD2 have their output currents subjected to a differential process so that the common-phase noise components are cancelled and opposite-phase signal components are summed, and data recorded in the data recording area MO is read out in enhanced condition of s/n ratio. Address data recorded in the address area ADD is retrieved from the light level signal resulting from the common-phase summation of the photodiode readout signals.

Although the number of photodiodes 40 and the treatment of their output currents differ depending on whether the optical pickup system is formed of an optical system that separates the reflected light into the P and S components, such as a Wollaston optical system (polarizing prism), or a double astigmatism (D-AS) optical system based on the astigmatism scheme, the final light level signal is produced by composing all photodiode currents in any of these optical systems and the signal is not significantly affected by the arrangement of optical system.

This embodiment uses the Wollaston optical system, in which case the focusing servo signal is produced by another optical system separately from the light level signal.

The reflected light from the MO disk 18 is partly used in an automatic power control (APC) loop for stabilizing the emission output of the laser diode LD. Specifically, part of the reflected light is directed to a polarizing beam splitter (PBS) 42, by which the light is attenuated, and projected by a lens 44 to a photodiode (front photodiode) PD3. The detected signal is fed through an operational amplifier 52 and another operational amplifier 54, which determines the characteristics of a loop filter in the APC loop 48, to a laser drive amplifier 56 in a laser drive system 50.

Since the intensity of reflected light is proportional to the laser power (emission power), the state of driving of the laser diode LD is stabilized by the APC loop 48 and the s/n ratio is improved eventually.

The laser drive system 50 includes a high-frequency signal generation circuit 58, which supplies a high-frequency signal HF of the order of 100 MHz to the laser drive amplifier 56 so that the driving (excitation) of the laser diode LD is modulated at this frequency. The superimposition of the high-frequency signal on the drive current of the laser diode LD alleviates the laser noise.

The light source 22 incorporates a photodiode (rear photodiode) PD4 located in close proximity to the laser diode LD, and it detects the intensity of the light emitted by the laser diode LD.

The reflected light from the MO disk 18 partially returns to the laser diode LD by way of the beam splitter 28 as mentioned above, causing the creation of laser noise. It is not possible to place an optical isolator in the path of the return light, which is used in the optical system of compact disk, and therefore the level of this return light (quantity of light) is significantly high.

The quantity of light emission is varied by the return light, and the output of the rear photodiode PD4 includes a noise component (laser noise) modulated by the return light. The detection output of light emission is fed to a current-to-voltage converting amplifier 60 having low-noise characteristics in a wide frequency range, by which noise components of the order of 100 kHz to the order of 1 MHz that is the bandwidth of the readout signal, are taken out.

The laser noise component has its bandwidth limited (adaptation) by a loop filter 62 in the negative feedback loop 64, and the result is fed back negatively to the laser drive amplifier 56. Based on this feedback, particularly negative feedback in the wide band including the laser noise region, the emission of laser diode LD is stabilized and the influence of the return light on the laser diode LD can be avoided. Consequently, the laser noise is reduced significantly.

Figure 1:
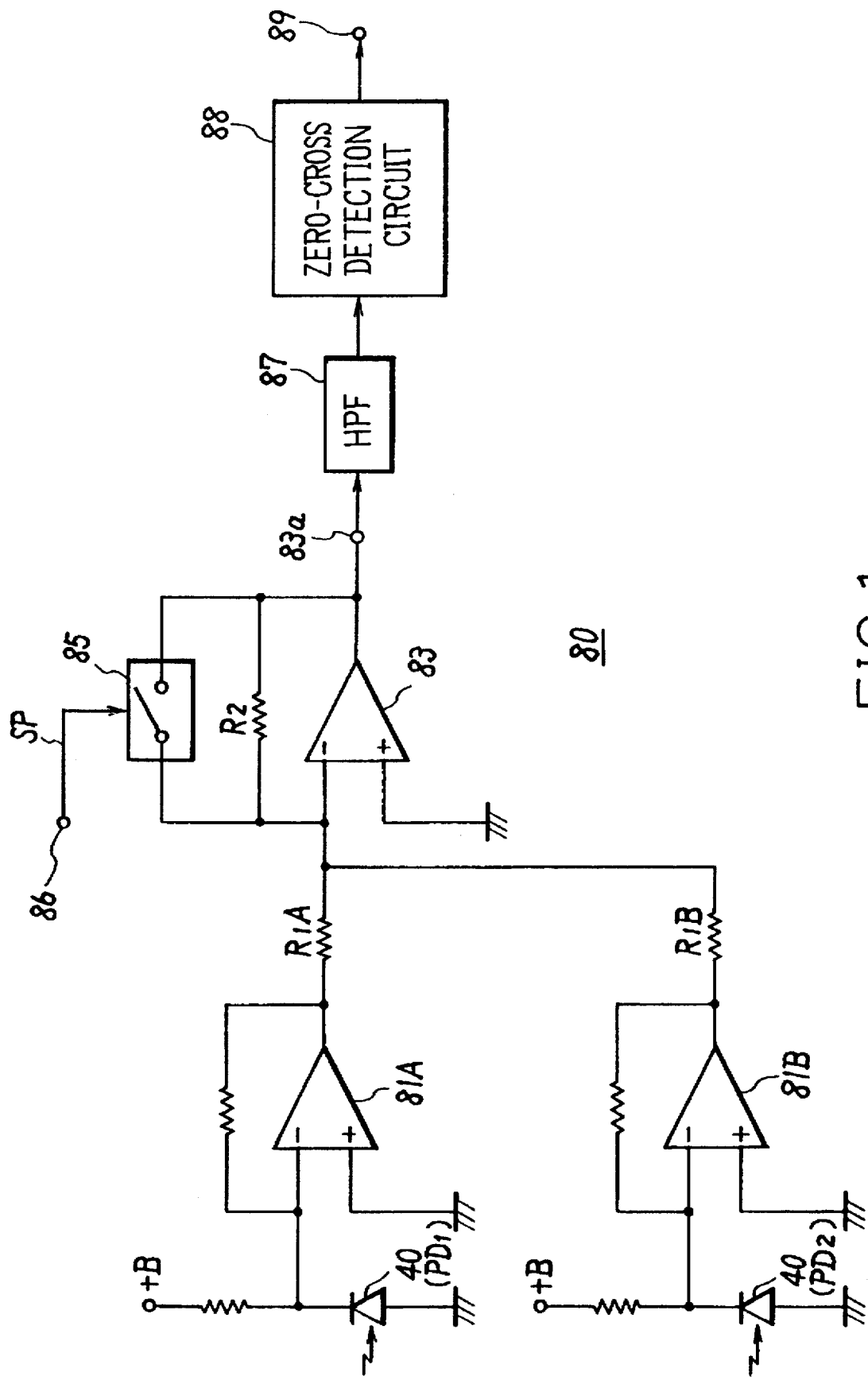
FIG. 1 is a schematic diagram showing the data reproducing circuit used in the optical recording/playback apparatus based on an embodiment of this invention.

The light level signal produced by the common-phase summation of the output currents of the photodiodes 40 is fed to the data reproducing circuit 80 shown in FIG. 1, by which address data is reproduced.

In FIG. 1, each of the photodiodes PD1 and PD2 represents expediently four photodiodes provided for each of two optical pickup systems, and its light level signal is simply the sum of the actual output currents of these photodiodes.

The output currents of the photodiodes PD1 and PD2 are fed to respective d.c. amplifiers 81A and 81B, by which the current signals are converted into voltage signals. The resulting voltage signals are applied to one end of each separate input resistors R1A, R1B (where R1A=R1B) of a summing amplifier 83, which is also a d.c. amplifier, having a feedback resistor R2 connected between the input and output terminals. The feedback resistor R2 is shunted by a switching means 85 when it turns on in response to a switching pulse SP received on the terminal 86.

The summing amplifier 83 has its output 83a fed to a data extracting comparator (zero-cross detection circuit) 88 by way of a high-pass filter 87 for a.c. coupling and d.c. blocking, and the extracted data is delivered to the output terminal 89.

In the data reproducing circuit 80 arranged as described above, the output currents of the photodiodes PD1 and PD2 are converted into voltage signals by the d.c. amplifiers 81A and 81B, and the voltage signals are summed by the summing amplifier 83. The switching means 85 provided on the feedback path of the amplifier 83 turns on in response to the switching pulse SP during the period of the data recording area MO (see FIG. 2B).

During the off-period of the switching means 85 for the address area ADD, the light level signal is amplified by the gain which is determined by the resistance values of the resistors R1A, R1B and R2. The switching means 88 turns on during the period of the data recording area MO, causing the resistor R2 to be shunted by it so that the amplifier has a zero gain, resulting in an amplifier output waveform as shown by FIG. 2C.

Figure 2:
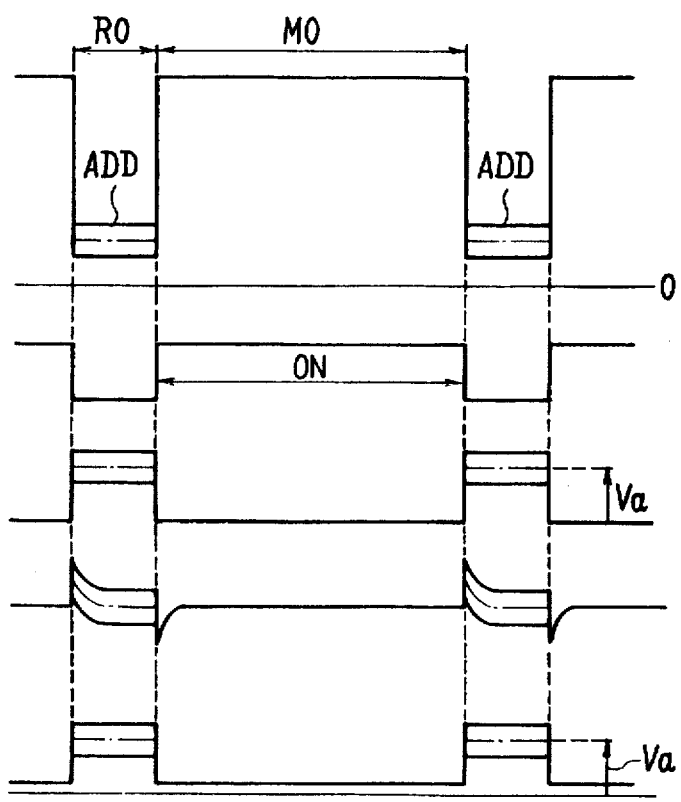
FIGS. 2A, 2B, 2C, 2D, and 2E are waveform diagrams used to explain the operation of this circuit.

Namely, the conventional circuit arrangement which does not alter the gain of amplifier has its d.c. output level of the light level signal varied greatly as shown by FIG. 2A, whereas the inventive circuit arrangement forces the amplifier to have a zero gain during the period of the data recording area MO so that only the amplified signal of the address area ADD has the d.c. level shown by FIG. 2A.

The amplifier output of this waveform is fed to the high-pass filter, which then produces a differentiation pulse having a peak level determined from the d.c. level difference, i.e., the output signal has a small level variation in the portion of the address area ADD as shown by FIG. 2D. This signal level variation is small enough for the comparator for data reproduction to follow accurately, and data in the address area ADD can be read out without error.

Figure 3:
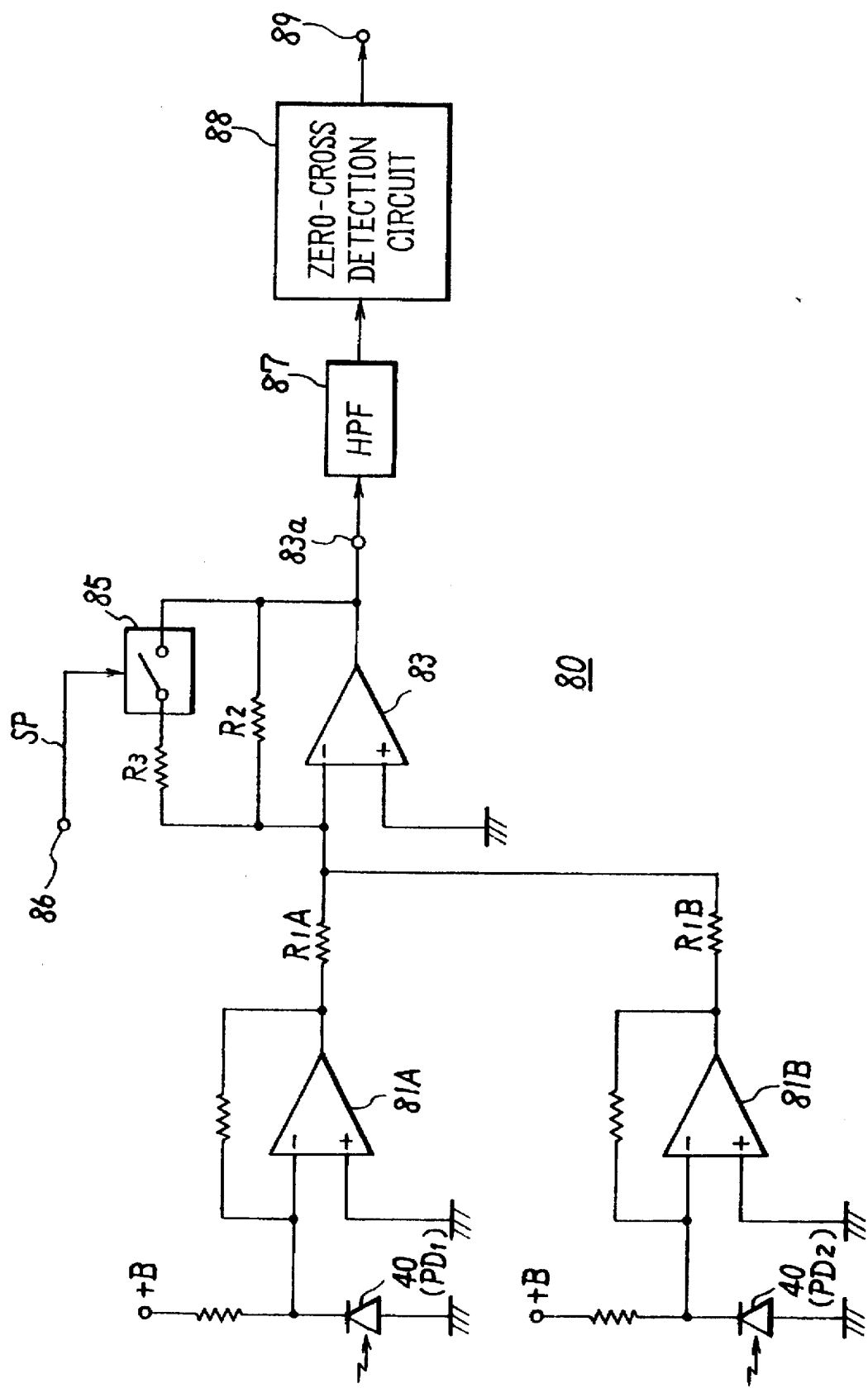
FIG. 3 is a schematic diagram showing another embodiment of the data reproducing circuit.

FIG. 3 shows another embodiment of this invention, in which component parts identical to those of FIG. 1 are referred to by the same symbols. This circuit arrangement includes a resistor R3 connected in series to the switching means 85. Due to the presence of the resistor R3, the on-state of the switching means 85 does not cause the summing amplifier 83 to have a completely zero gain, resulting in a small d.c. output during the period of the data recording area MO as shown by FIG. 2E. However, this d.c. output for the data recording area MO is eliminated when the signal is fed through the high-pass filter, which then produces the same differentiation output shown by FIG. 2D. The resistors R1, R2 and R3 have their resistance values set arbitrarily.

Although the switching means 85 may also be closed in operational modes having a small d.c. level difference between the address area ADD and data recording area MO as in the reading mode, this operation may be omitted in the reading mode.

In the recording mode, there is a great difference in laser power between the address area ADD and data recording area MO, and therefore the application of this invention obviously attains the same effect as in the erasing mode.

Figure 10:
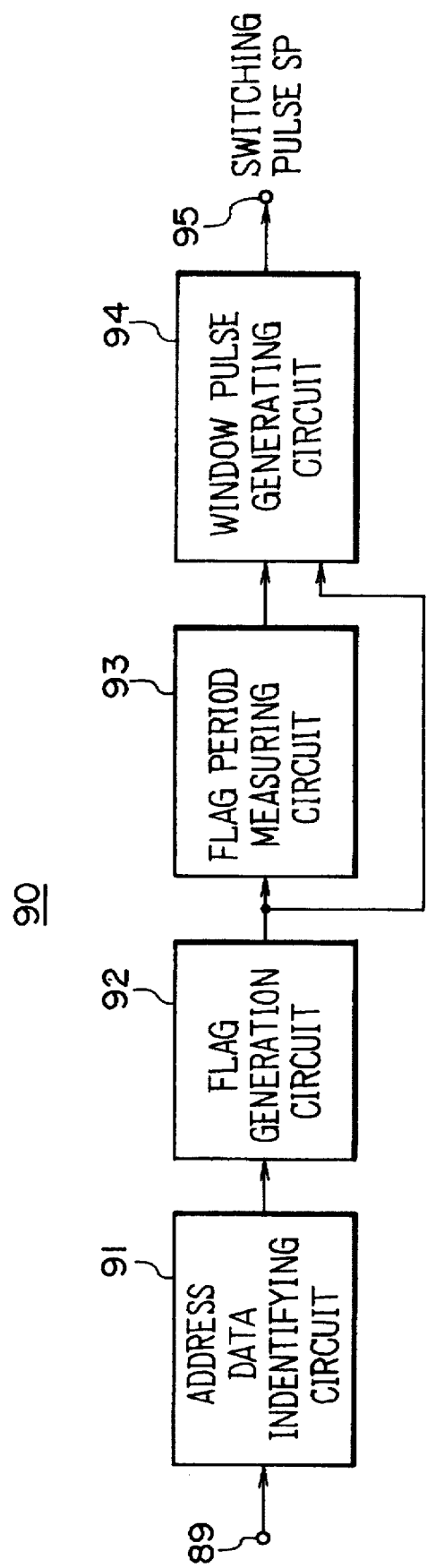
FIG. 10 is a block diagram showing the circuit arrangement for producing a switching pulse which controls the gain of the amplifier.

FIG. 10 shows the circuit arrangement for forming the switching pulse SP. When the optical recording/playback apparatus 10 is in the reading mode, data extracted by the zero-cross detection circuit 88 is sent from the output terminal 89 to an address data identifying circuit 91.

The address data identifying circuit 91 identifies address data ADD1, ADD2 and ADD3 in the reproduced data and produces a pulse signal at each identification. Accordingly, the circuit 91 produces three pulses at maximum in correspondence to the address data ADD1, ADD2 and ADD3. These pulses are fed to a flag generation circuit 92.

The flag generation circuit 92 generates a flag in a certain timing relationship with the sector marker SM regardless of the number of pulses (one, two or three) received. The flag indicates that any of address data ADD1, ADD2 and ADD3 has been identified, and it is fed to a flag period measuring circuit 93 and window pulse generation circuit 94.

The flag period measuring circuit 93 counts period measuring clock pulses between time points of flag reception and delivers the count value as period data to the window pulse generation circuit 94.

The window pulse generation circuit 94 anticipates the timing of readout of the address area ADD based on the time point of flag generation and the period data, and generates a window pulse at the anticipated timing. In order to cope with the suspension of flag generation, the window pulse generation circuit 94 has a function of generating dummy flags that have timing information of the flag before it has ceased and holding the period data, so that the circuit produces window pulses from these information and delivers the window pulses uninterruptedly even if the supply of flag is suspended at the time of mode switching or the like. The generated window pulse is used for the switching pulse SP.

Although the optical recording/playback apparatus of the foregoing embodiments use the optical system which separates the reflected light into the P and S components, the present invention is also applicable to optical recording/playback apparatus which use the usual optical system having its objective lens 32 and laser diode accommodated in the same housing.

As described above, the optical recording/playback apparatus based on this invention has its operational amplifier devised to have a zero or near-zero gain by being timed to the treatment of the light level signal of the data recording area.

Consequently, even if the light level signal varies the d.c. level greatly, the differentiation waveform can have a moderate peak level and the multiple precoded address data including the leading one can be read out reliably.

Accordingly, the present invention can be applied suitably to optical recording/playback apparatus using magneto-optical disks on which the precoded address area is read out in the form of a light level signal.

In addition, the present invention can be applied suitably to optical recording/playback apparatus of phase-change recording type using optical recording mediums on which the precoded address area is read out in the form of a light level signal.

What is claimed is:

1. An optical recording/playback apparatus which projects a laser beam on to a optical recording medium, on which address data is precoded, to read out address data and record or read out data in a data recording area, said apparatus including an address reproducing circuit comprising:

optical detection means for detecting the reflected light of the projected laser beam;

address data amplifying means, which has two, switchable gains, for converting the output of said optical detection means into a light intensity signal which represents the total quantity of the reflected light received by said optical detection means and amplifying the light intensity signal with one of the two gains;

control means for switching the gain of said address data amplifying means to have one gain for a period during which the precoded address data area is being reproduced and a substantially zero gain for a period during which the data recording area is being erased/recorded;

high pass filter means for high-pass filtering the light level signal as amplified by the address data amplifying means; and zero-cross detection means for detecting a zero-cross point of the light level signal high-pass filtered by the high pass filtering means to produce address data.

2. An optical recording/playback apparatus according to claim 1, wherein said optical recording medium comprises a magneto-optical recording medium, and said optical detection means includes at least a pair of photosensors, wherein said photosensor pair comprise elements each producing an electric current which represents the quantity of received light, and said address data amplifying means includes current-to-voltage converters which convert the output currents of said elements into voltages and a summing amplifier which sums the output voltages of said current-to-voltage converters and amplifies the summed voltage with said switched gains.

3. An optical recording/playback apparatus according to claim 1, wherein said control means operates in the reading mode of said apparatus to anticipate the timing of the readout period of the address area of said recording medium based on the detection of readout data to be address data, generate a signal indicative of the anticipated timing, and switches the gain of said address data amplifying means with the generated signal.

4. An optical recording/playback apparatus according to claim 3, wherein said control means includes identification means which identifies data detected in the address area of said recording medium to be address data and produces a pulse signal in response to the identification, flag generation means which generates a flag at a prescribed timing based on the output of said identification means, flag period measuring means which measures the period of generation of the flag, and window pulse generation means which generates a window pulse at the timing of the address area in accordance with the generated flag and the output of said flag period measuring means, and said address data amplifying means has its gain switched by said window pulse.

5. An optical recording/playback apparatus according to claims 1 or 2, wherein said address data amplifying means has switchable gains having a first value that is zero or close to zero and a second value that is greater than the first value, and said control means sets the gain of said address data amplifying means to be the first value for the period of erasing/recording the data recording area or to be the second value for the period of reproducing the precoded address area.

6. An optical recording/playback apparatus according to claim 1, wherein said control means operates in the reading mode of said apparatus to anticipate the timing of the readout period of the address area of said recording medium based on the detection of readout data to be address data, generate a signal indicative of the anticipated timing, and control the gain of said address data amplifying means with the generated signal; and wherein said address data amplifying means has gains having a first value that is substantially zero and a second value that is greater than the first value, and said control means sets the gain of said address data amplifying means to either be the first value during the period of reproducing the data recording area or to be the second value during the period of erasing/recording the precoded address area.

* * * * *